(12) United States Patent
Le Bars et al.

(10) Patent No.: US 6,942,369 B2
(45) Date of Patent: Sep. 13, 2005

(54) DEVICE FOR THE AUTOMATIC ADJUSTMENT OF THE POSITION OF THE HEADLIGHTS ON A MOTOR VEHICLE

(75) Inventors: Jean-François Le Bars, Bobigny Cedex (FR); Robert Phan Van Ho, Bobigny Cedex (FR); Ludovic Toulisse, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 82 days.

(21) Appl. No.: 10/634,029

(22) Filed: Aug. 4, 2003

(65) Prior Publication Data
US 2004/0022063 A1 Feb. 5, 2004

(30) Foreign Application Priority Data
Aug. 5, 2002 (FR) .............................. 02 09966

(51) Int. Cl.⁷ ................................................ B60Q 1/00
(52) U.S. Cl. ........................ 362/464; 362/39; 362/276; 362/802
(58) Field of Search ..................... 362/464, 465–467, 362/276, 37, 39, 802

(56) References Cited
U.S. PATENT DOCUMENTS
5,473,697 A * 12/1995 Ishihara ...................... 381/63

6,477,026 B1 * 11/2002 Lemke ........................ 361/152
6,480,806 B1    11/2002 Bilz et al.
6,572,248 B2 *  6/2003 Okuchi et al. .............. 362/464

FOREIGN PATENT DOCUMENTS
| DE | 199 05 173 A1 | 8/2000 |
| EP | 1-088 700 A2 | 4/2001 |
| FR | 2 365 461 | 11/1976 |

OTHER PUBLICATIONS
International Search Report, Dated Apr. 15, 2003.

* cited by examiner

Primary Examiner—John Anthony Ward
Assistant Examiner—Mark Tsidulko
(74) Attorney, Agent, or Firm—Morgan & Finnegan, LLP.

(57) ABSTRACT

The aim of the invention is a device for the automatic adjustment of the position of at least one headlight of a motor vehicle in relation to the bodywork by pivoting around at least one axis which is essentially parallel to the road surface, the said device comprising at least one actuator capable of making the said headlight(s) pivot, at least one sensor integral with the vehicle, and more particularly fixed to the chassis close to one of the vehicle wheels, and at least one electronic system to control the actuator with the aid of information provided by the sensor(s). The said electronic control system, or at least the essential part of its components, is fixed to or implanted in the actuator.

25 Claims, 9 Drawing Sheets

DEVICE FOR THE AUTOMATIC ADJUSTMENT OF THE POSITION OF THE HEADLIGHTS ON A MOTOR VEHICLE

FIELD OF THE INVENTION

The object of this invention is a device for the automatic adjustment of the position of the headlights on a motor vehicle.

BACKGROUND OF THE INVENTION

Vehicles are known to be fitted with such devices, the aim of which is automatically to correct the position of the light in relation to the bodywork so as to avoid dazzling the drivers of oncoming vehicles. Since the headlights are connected rigidly to the vehicle, the load condition of the latter translates into a rise in the cut-off point of the light beam emitted by the headlights (the "cut-off point" being the limit between the area illuminated and the area not illuminated by the headlight). This rise of the light beam creates a risk of dazzling oncoming drivers. The above-mentioned adjustment device enables the angle of the headlights to be corrected automatically on the basis of information from sensors suitably located on the vehicle chassis so as to render the cut-off point of the light beam as stable as possible, whatever the vehicle load. Patent FR-2 365 461 describes an example of an adjustment device of this type, which comprises a control loop that uses sensors, a control organ comprising a computer and a motor capable of adjusting the angle of the headlight. This device is completely satisfactory in terms of reliability, performance and reliability.

However, there is a need for a different adjustment device, particularly one which has a simpler operating system and/or which offers additional functions or is easier and less complicated to make.

The aim of this invention is therefore to provide an improved adjustment device of this nature.

The primary aim of the invention is a device for the automatic adjustment of the position of at least one motor vehicle headlight in relation to the bodywork by pivoting around at least one axis which is essentially parallel to the road surface. The device comprises at least one actuator capable of making the said headlight(s) pivot, at least one sensor integral with the vehicle, and more particularly fixed to the chassis close to one of the vehicle wheels, and at least one electronic system to control the actuator with the aid of information provided by the sensor(s). According to the invention, the essential part of the electronic control system is fixed or implanted in the actuator. The "essential part" of the electronic system refers to the fact that all or almost all of its components are actually fixed to or implanted in the actuator. However, the invention also provides that individual and/or a small number of components may be located outside the actuator, more particularly on the electrical wiring of the vehicle, such as resistors.

The aim of the invention also includes the process of fitting and initialising such a device in a vehicle and the process of putting the said device into operation once fitted in the vehicle. The aim of the invention also includes the vehicle fitted with such a device.

Making the electronic system integral with the actuator is highly advantageous. In fact, until now, the electronic system was usually located elsewhere in the vehicle, more particularly fixed to the chassis near one of the sensors or on the dashboard. These locations require long lengths of wiring and measures to ensure that the system will remain watertight. Placing the electronic system in the actuator, however, offers a much more economical wiring solution, a more compact adjustment device and easier fitting of the device in the vehicle. If, moreover, all the electronics are located inside the actuator box, the essential need for watertightness is met by the actuator box itself.

Preferably, the device according to the invention comprises at least two sensors, one at the front and one at the rear of the vehicle.

SUMMARY OF THE INVENTION

According to a first variant of the invention, the device according to the invention comprises one (master) electronic control system to adjust both vehicle headlights, with one actuator per headlight, the said system being connected to one of the two actuators. In this configuration, the other actuator has no master electronic system. It may, however, contain "slave" electronic devices such as simplified electronic cards to relay the master electronic system linked to the other actuator. The advantage of this variant is that the amount of electronics as a whole within the chain of the adjustment system for both headlights is reduced.

According to a second variant of the invention, the device according to the invention comprises an electronic control system connected to one actuator per headlight. The advantage of this second variant is that all the actuators on the vehicle, and the electronic system associated with them, can be absolutely identical.

Advantageously according to the invention, the electronic control system(s) can be removed from the actuator to which it/they is/are fixed or in which it/they are implanted. The actuator's electronic system can therefore be easily replaced/repaired.

Preferably, the electronic system according to the invention is in the form of an electronic card. This is also preferably the case with the above-mentioned "slave" electronic devices.

According to a first embodiment, the electronic control system(s) according to the invention is/are numerical. It advantageously comprises at least one computer. This uses tested and well-known electronic devices.

According to a second embodiment, the electronic control system(s) is/are analogue. It is highly advantageous to choose an electronic system which for its essential part and indeed in its entirety depends on analogue components. The invention in this embodiment forgoes the use of a microcontroller in favour of the simplest and fewest analogue components possible. This results in an angle adjustment device which is simpler to make, simpler to implant in the vehicle and simpler to replace, without losing reliability or performance.

In order to achieve this result, the inventors have re-written the law for calculating angle correction:

In the case of a system with two sensors, to be fitted to both actuator motors, the law is expressed as is known in the following form:

$$Ass = kaV(VcaptAV - VcaptAV(0)) - kAR(VcaptAR - VcaptAR(0)) \quad (i)$$

where:
Ass=calculated trim angle of the vehicle
VcaptAV=signal from front sensor
VcaptAV(0)=signal from front sensor during calibration stage (vehicle unladen and stationary)

VcaptAR=signal from rear sensor

VcaptAR(0)=signal from rear sensor during calibration stage (vehicle unladen and stationary)

KAV=correction factor of front sensor

KAR=correction factor of rear sensor

Existing digital systems sample, code, and count the CaptAV and CaptAV(0), CaptAR and CaptAR(0) values, then subtract them and finally multiply them by a factor stored in the memory.

The principle according to the invention consists in re-writing the law in the form:

$$Ass=(kAV \times VcaptAV - kAR \times VcaptAR) - (kAV \times VcaptAV(0) - kAR \times VcaptAR(0)) \quad \text{(ii)}$$

The second term of this law (ii) represents a constant value. This fixed part may be eliminated in an analogue manner, thanks to an electronic embodiment (examples of which are described in detail below) in which gains kAV and kAR are in the ratios of the resistances used.

Whilst the headlight is being adjusted on the vehicle, the initialisation operation therefore consists in adjusting the variable resistance so that the control voltage of the actuator's motor brings the actuator to its nominal position.

Any further change in the VcaptAV and VcaptAR values will be interpreted and treated as a change in the trim angle in relation to the initialisation value.

For a one-sensor system, the trim angle correction law is as follows:

$$Ass = kAR \times VcaptAR - kAR(0) \times VcaptAR(0) \quad \text{(iii)}$$

The second term may also be eliminated in an analogue manner thanks to a simple electronic embodiment, an example of which is described in detail below.

Similarly, during the initialisation stage, potentiometer adjustment enables the control voltage of the motor to be brought back within its nominal range.

Electronic systems of this type (analogue) thus enable the desired correction function to be obtained in a simple manner, doing away with computers.

Accuracy can be improved by using two resistors and reversing the supply of the two sensors in relation to the vehicle's movement.

For demonstration purposes, analogue sensor resistors are regarded as equal and comply with the following inequality: Rcapt<<RAV,RAR.

The vehicle's position is represented by the coefficient $\alpha AV$ for the front sensor as in $VcaptAV = \alpha AV \times Vcc$ and for the rear sensor by $VcaptAR = (1-\alpha AR) \times Vcc$ insofar as the voltage reference frames are reversed.

The resulting voltage VR at point R is:

$$VR = (VcaptAV \times RAR/(RAR+RAV)) + VcaptAR \times RAV/(RAR+RAV)$$

Where $$VR = (Vcc/(RAR+RAV)) \times (\alpha AV \times RAR + (1-\alpha AR) \times RAV)$$

On initialisation, VR(0) is:

$$VR(0) = (Vcc/(RAR+RAV)) \times (\alpha AV(0) \times RAR + (1-\alpha AR(0)) \times RAV)$$

That is to say, $$VR - VR(0) = (Vcc/(RAR+RAV)) \times ((RAR \times \alpha AV - RAV \times \alpha AR) - (RAR \times \alpha AV(0) - RAV \times \alpha AR(0)))$$

We thus return to the trim angle law ASS calculated above in which kAV and kAR are proportional to RAR and RAV respectively.

In order to apply this new mode of analogue correction, the electronic control system in this embodiment may advantageously comprise the following components: at least one integrator, at least one subtracter, at least one follower. It also preferably comprises at least one potentiometer. It also preferably comprises at least one potentiometer. It also preferably comprises resistors, notably two, which are located either with the rest of the electronic system or outside the actuator(s), notably on the vehicle's electrical wiring or even near the sensors.

Whether the electronic system is analogue or digital, an initialisation stage must be performed when the adjustment device is fitted on the vehicle. Advantageously, the device according to the invention has means of initialisation to be used to adjust the actuator motor to its nominal position, the said means comprising a means of adjustment accessible from outside the actuator box and connected to a warning device, more particularly visual, audible or electrical, of the state of progress of the initialisation process. This warning device is advantageous if this operation is done manually (to warn the operator who is adjusting the adjustment device that initialisation is over). It is just as useful if this operation is done automatically, with a tool which can then be fitted with a control system and a sensor appropriate to the warning device fitted.

Advantageously, the warning device is a light source such as a light-emitting diode. The latter may be integrated into the actuator box and protected by a transparent screen, more particularly in the form of a transparent moulding on the said box.

As mentioned above, the adjustment device may be adjusted automatically by a tool of the screwdriver type, the said tool responding to a stop/start control system using a sensor, more particularly an optical sensor located on the said tool, capable of detecting the end-of-adjustment warning signal from the warning device, a signal which may cause the light-emitting diode to light up.

If we take the second embodiment of the invention concerning analogue operation of the electronic system, when making adjustments to the headlight on the vehicle, the initialisation operation consists in adjusting the variable resistor (a potentiometer) so that the control voltage of the actuator motor brings the actuator back to its nominal position. During adjustment, the voltage applied to the actuator terminal is compared to the minimum and maximum nominal values accepted by the actuator. When this value is within the appropriate range the device can activate a light-emitting (for example) diode and/or emit a signal informing the operator that the adjustment is satisfactory.

Advantageously, the device according to the invention has a sequential mode of operation.

More particularly if an analogue electronic system is used, the device may then be fitted with an electronic system which enables the correction to be sampled. When the voltage at the battery changes, due to the filtering circuit on the sensor signals, the charge and discharge of a capacitor cause a delay in the voltage coming from the sensors. This delay results in a change of demand for the corrector. The electronic control system seeing this change then activates the motor to meet the new demand, which results in power being supplied to the motor each time the battery voltage changes.

This problem then causes the corrector to cut in, when it should not. The service life of the actuator may thus be reduced.

In order to solve this problem, a correction window is opened for a few seconds every x minutes. During the interval of time between two corrections, the above-mentioned capacitor must have completed charging or discharging during a change in the supply voltage. For this reason, a low-pass filter time constant of less than x minutes must be chosen. Thus, the service life of the corrector is increased, the corrector will only correct every x minutes, when there is a real change in demand.

The device according to the invention advantageously comprises a mode of handling faults by instructing the actuator to tilt the light(s) downwards. In fact, the device is designed to comply with safety regulations so that, in the event of a fault, the lights remain in their adjustment position or tip downwards. A visual warning device, such as a light-emitting diode, or an audible one could be provided on the actuator or headlight and/or vehicle dashboard when the fault handling system is activated.

Upward movement is not permitted. This is to avoid the risk of dazzling the drivers of oncoming vehicles. "Fault" information is available, for instance, either on one of the actuator inputs or on the actuator itself, or on both, in the form of a (red) warning light.

A detailed description of the invention now follows, including examples which are in no way limiting, with the aid of the following figures:

DESCRIPTION OF THE PREFERRED EMBODIMENTS

Figure 1:
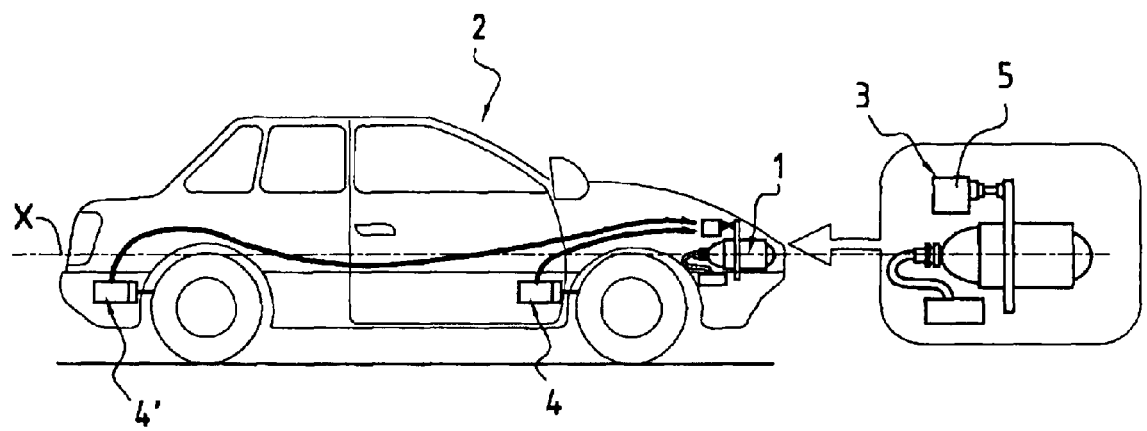
FIG. 1: A diagram of a vehicle fitted with an adjustment device according to the invention.

FIG. 1 shows a vehicle 2 fitted with two headlights 1, 1', a front sensor 4 and a rear sensor 4' fixed to the chassis of vehicle 2. An actuator 3, 3' is connected to each headlight 1, 1'. The electronic control system 5, 5' of the actuators is implanted in the latter: either one electronic control system per actuator or one electronic system in one of the actuators which "drives" both actuators. This provides a more compact adjustment system than ever before, where the electronic system is fitted, by way of example, on the vehicle chassis or on the dashboard.

Figure 2:
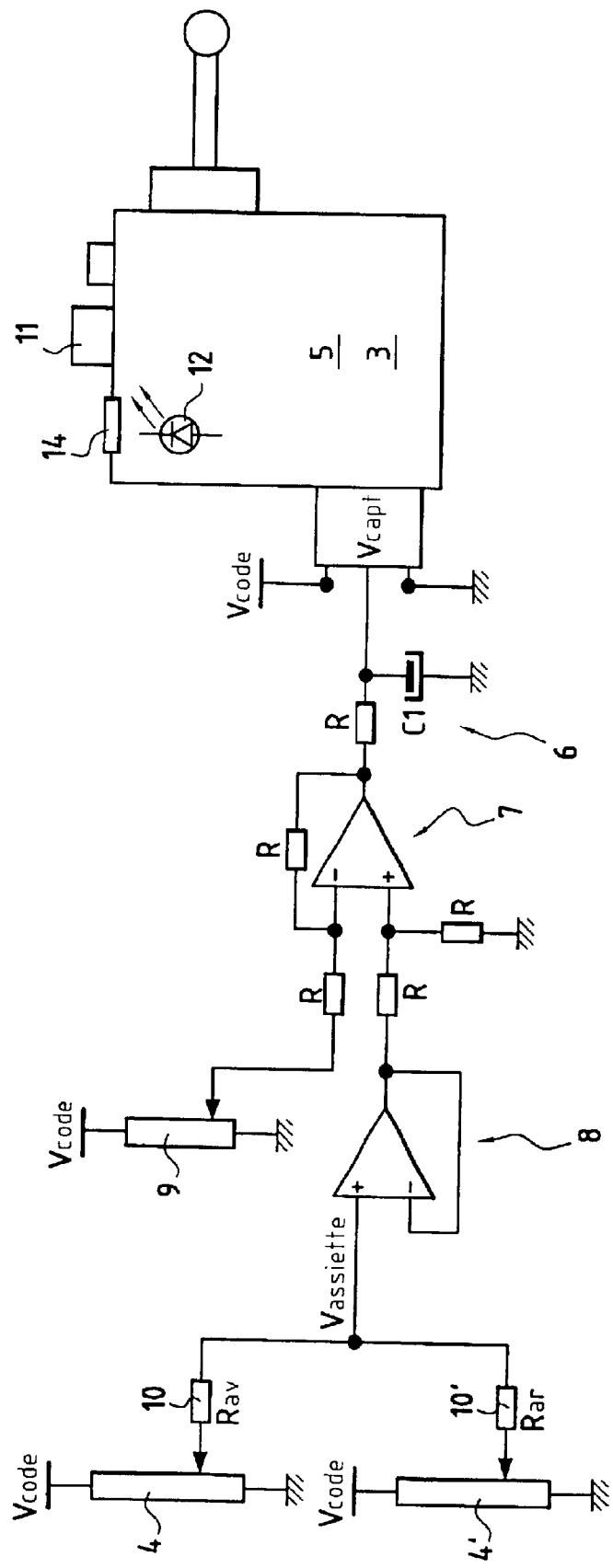
FIG. 2: A representation of an actuator with a first electronic variant of the analogue type according to the invention.

FIG. 2 shows an example of a completely analogue electronic circuit according to the invention, applying the correction law adopted by the inventors and described above (Equation (ii)). This circuit comprises a potentiometer 9, a follower 8, a subtracter 7 and an integrator 6. The circuit also comprises two resistors 10, 10' which can be integrated with the other components of the circuit in the actuator 5. These two resistors, as described below, can alternatively be located on the electrical wiring of the vehicle the actuator 5, shown in a very simplified manner in this Figure, therefore integrates this electronic system, with the possible exception of resistors 10, 10'. There are two adjustment buttons on the actuator: the button 11 for adjusting the electrical zero of sensors 4, 4' described in more detail below, a light-emitting diode 12 under a transparent window located on the actuator box, and an adjustment button, shown on the side of the actuator box, which, in a known way, is used to adjust the horizontal position of the lights manually.

Figure 3:
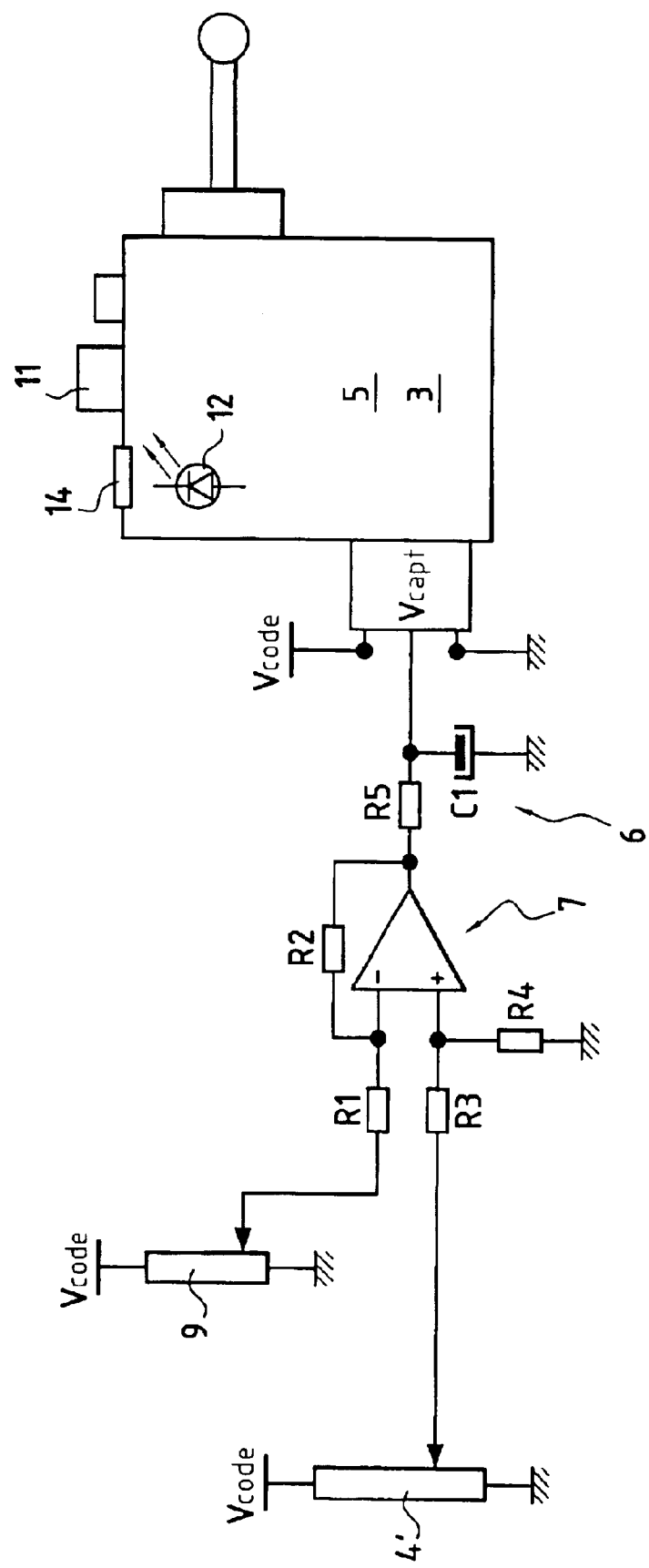
FIGS. 3 to 7: Representations of an actuator with different electronic variants of the analogue type according to the invention.

FIGS. 3 to 7 are different variants of the electronic system 5:

FIG. 3 shows potentiometer adjustment enabling the control voltage of the actuator motor to be brought back within its nominal range.

Figure 4:
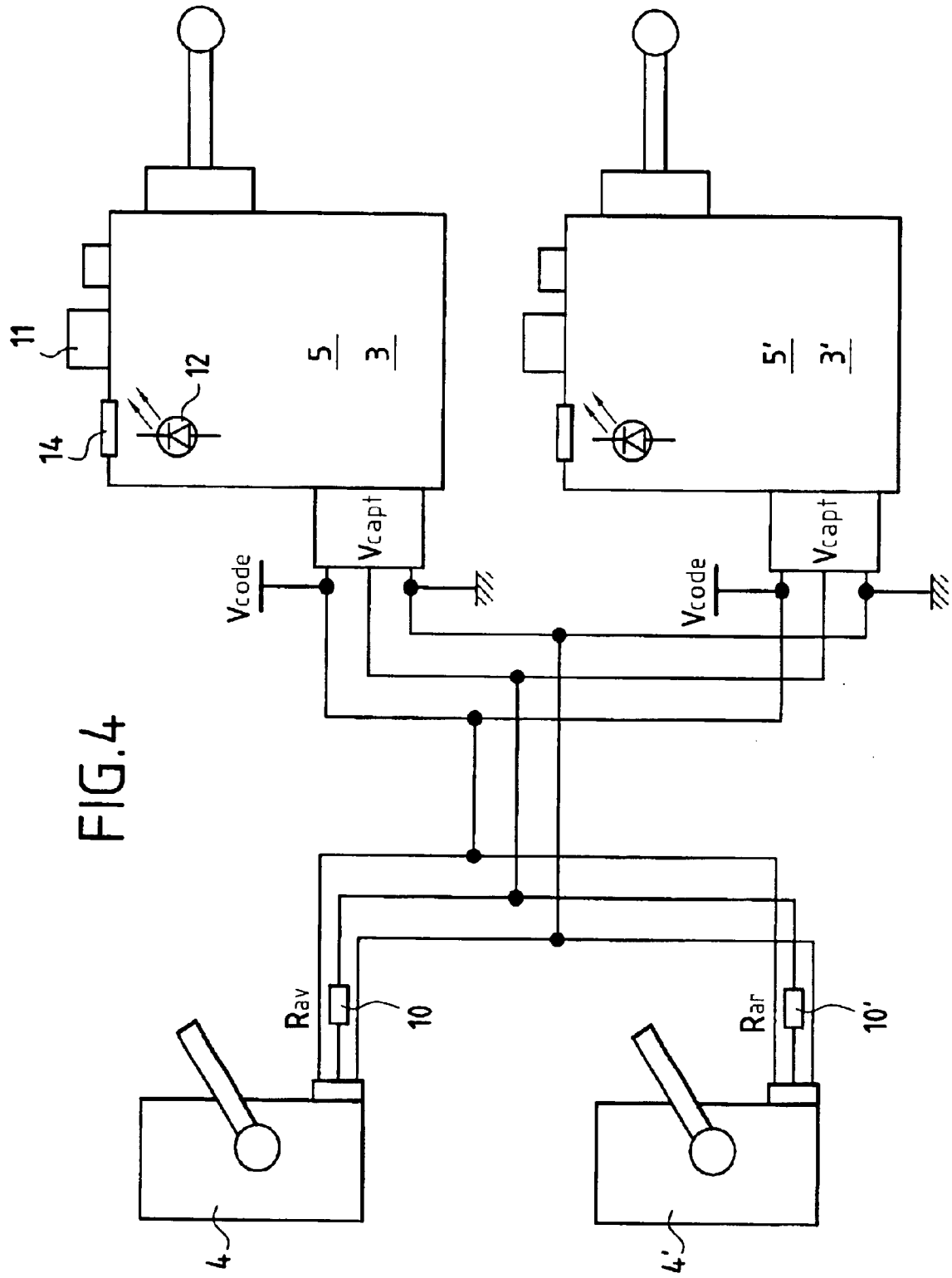

FIGS. 4 to 7 show different implantations of the electronic system:

FIG. 4: Adjustment of the electrical zero of the sensors serves to take up any position errors of the sensors on the vehicle, the action taking place on the button 11 at the end of the production line at the manufacturer, the resistors 10,10' being integrated within the vehicle wiring.

Figure 5:
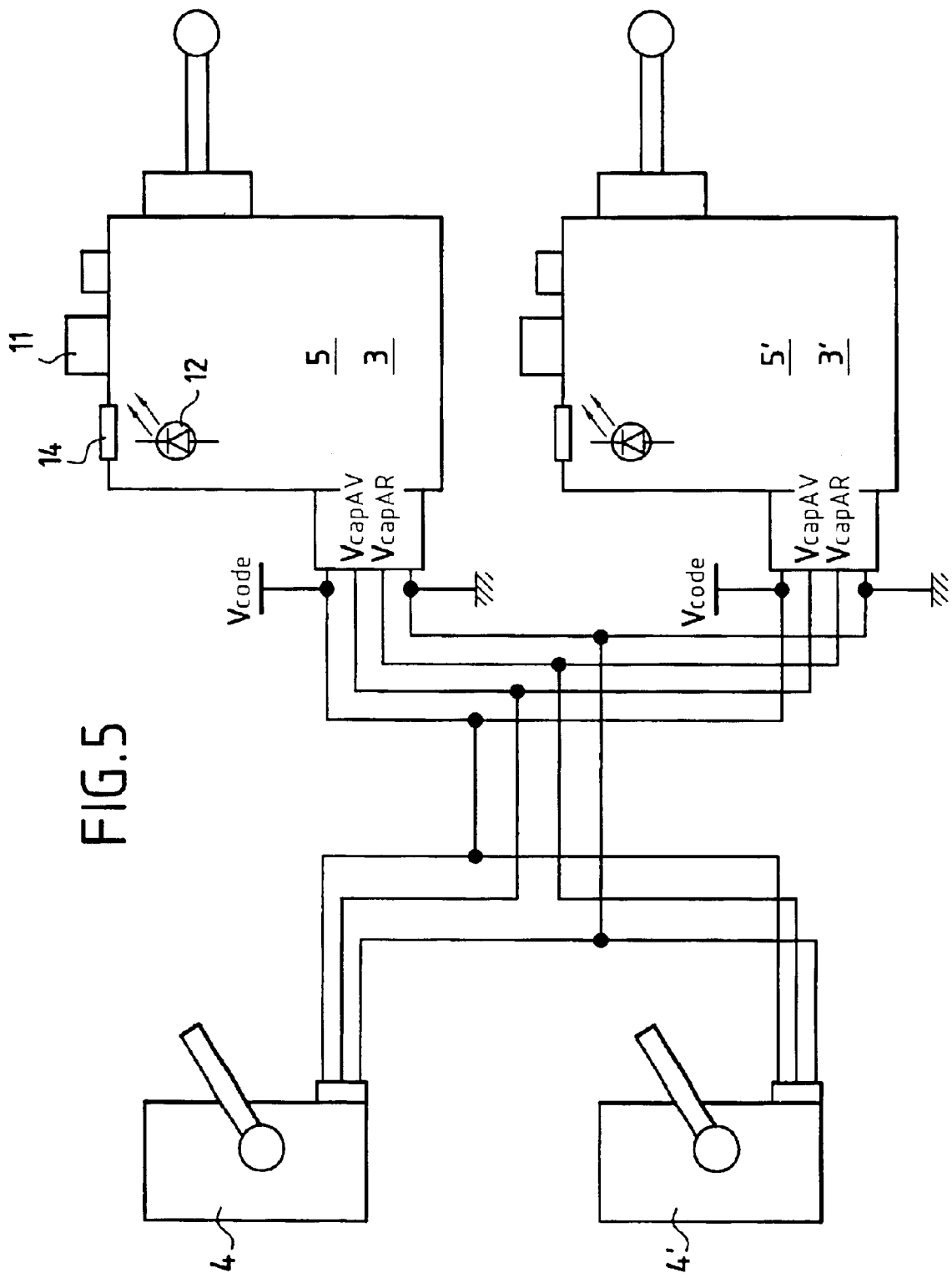

FIG. 5: the electrical zero is adjusted as per the preceding figure, the four-wire connector. Here we have one electronic system 5, 5' per actuator 3, 3', therefore one per headlight, and the two resistors 10, 10' are integrated into the rest of electronics 5 and 5' respectively.

Figure 6:
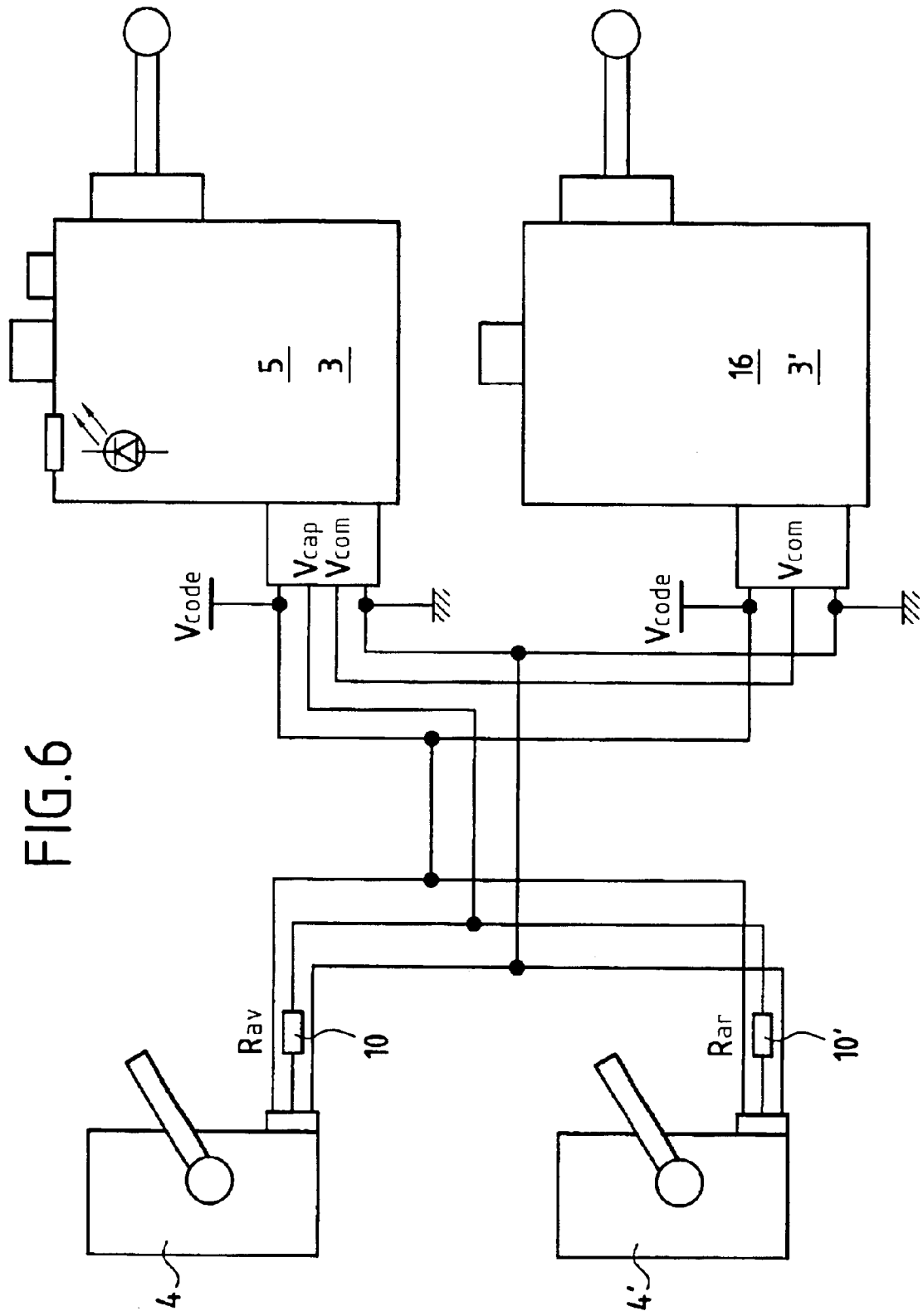

FIG. 6: This shows another variant with one ("master") electronic system 5 according to the invention for one of the five-wire actuators and one simplified ("slave") electronic system 16 for the other actuator, of well-known design. This is an economically advantageous solution. Furthermore, both resistors 10, 10' are outside the actuator 3. The advantage of this solution is that, from one model of vehicle to another, the same electronic card supporting the electronic system can be retained, within the actuator, leaving only the resistors to be adapted/adjusted.

Figure 7:
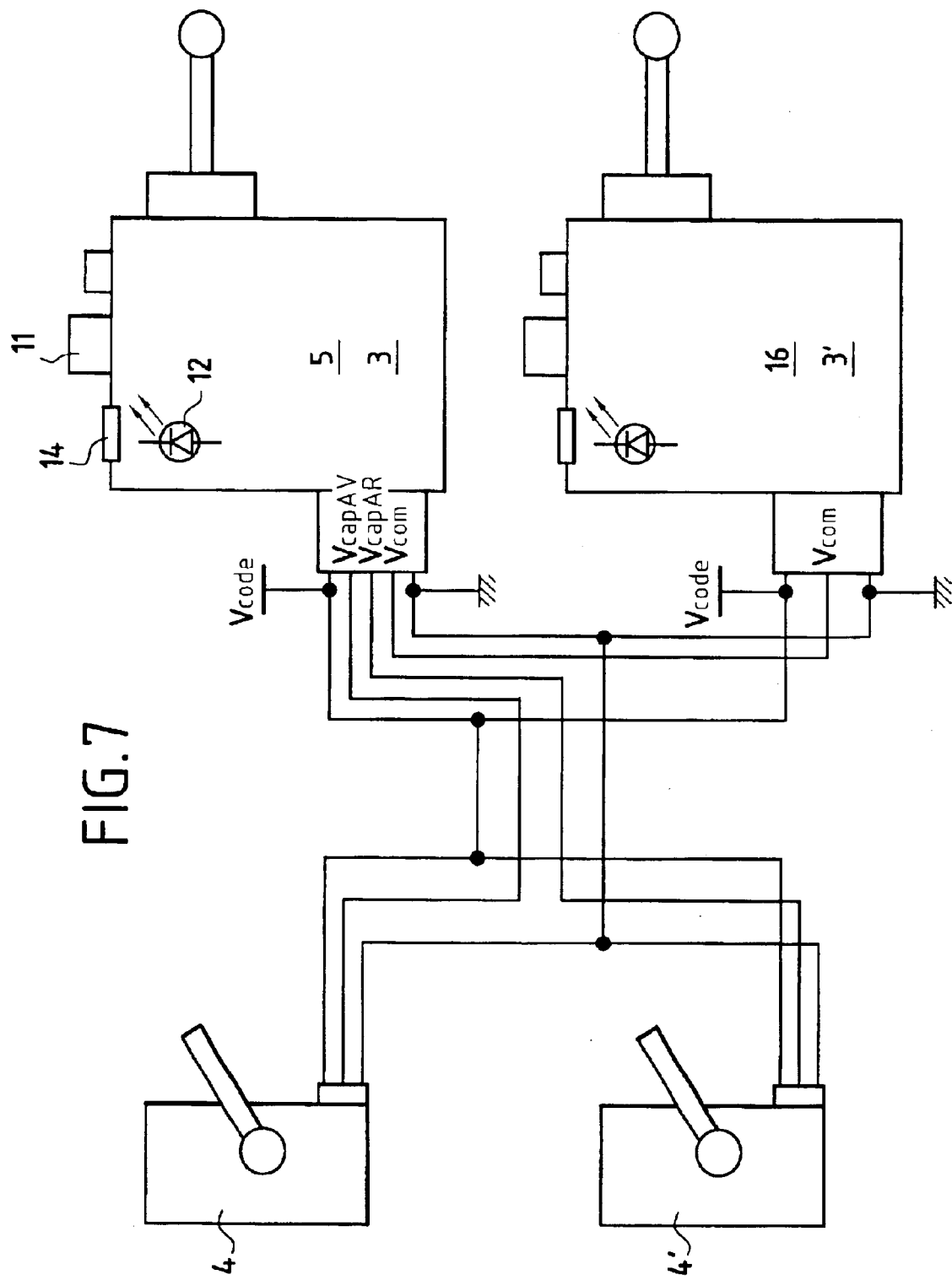

FIG. 7: This shows the same configuration as FIG. 6, with a master electronic system 5 within an actuator 3 and a simplified electronic system 16 within another actuator 3'. In this instance, both electrical resistors 10 10' are arranged with the rest of the "master" electronics 5 within the actuator 3. The advantage of this solution is that it also enables total integration of the electronic circuit: everything can be integrated in the actuator box.

Figure 8:
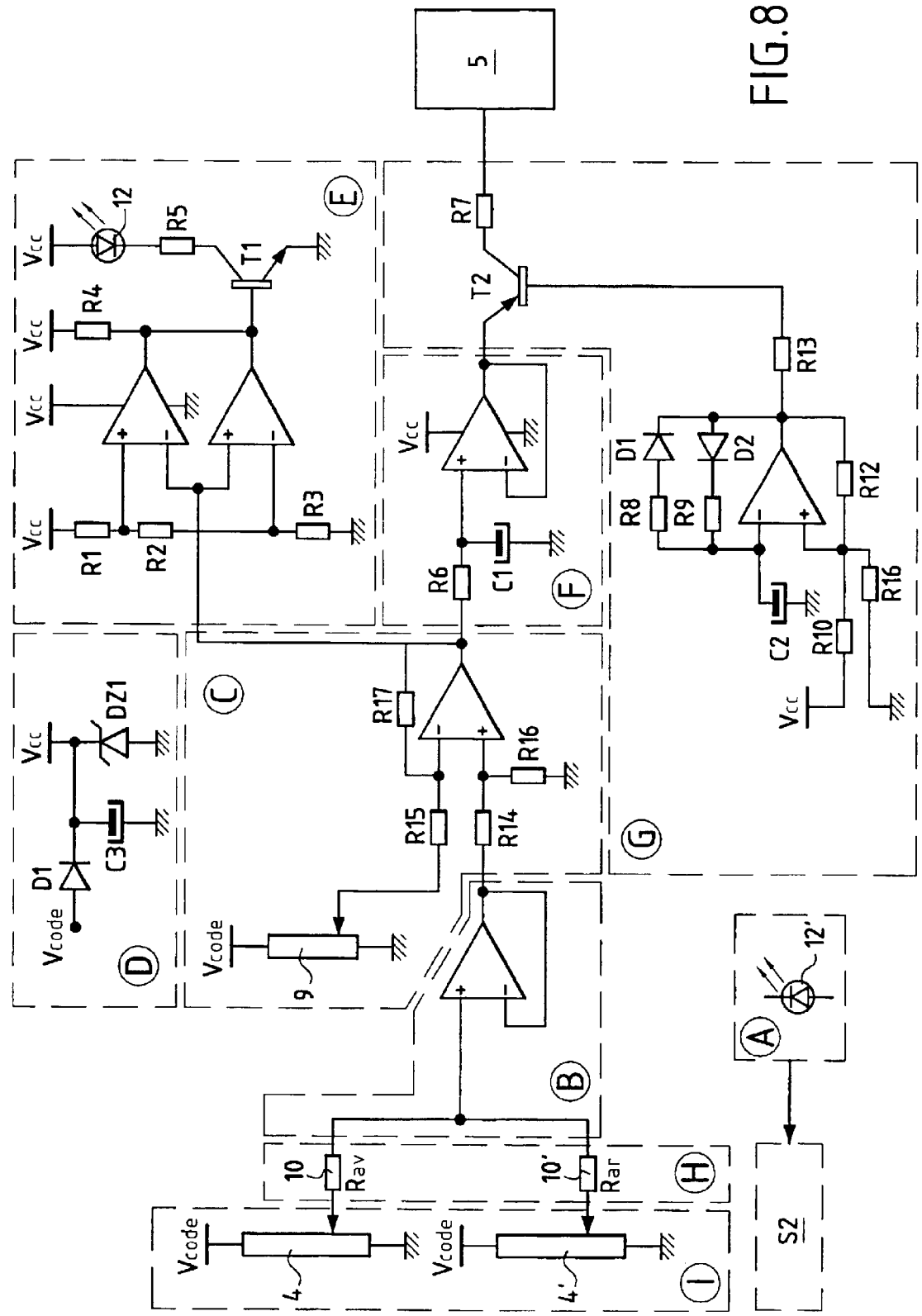
FIG. 8: A summary diagram of an electronic system according to the invention.

FIG. 8 is a simplified diagram of the electronics 5. It shows:

Unit A which handles the fault mode, with a light-emitting diode 12' which warns that the system is passing into fault mode.

Unit B which calculates the weighted average of the sensors.

Unit C which is an adder

Unit D which is an overvoltage protection system.

Unit E which is a window comparator.

Unit F which is a filter system.

Unit G which is a pulse generator.

Unit H which represents the two resistors 10, 10' described above.

Unit I which represents sensors 4, 4'.

Figure 9:
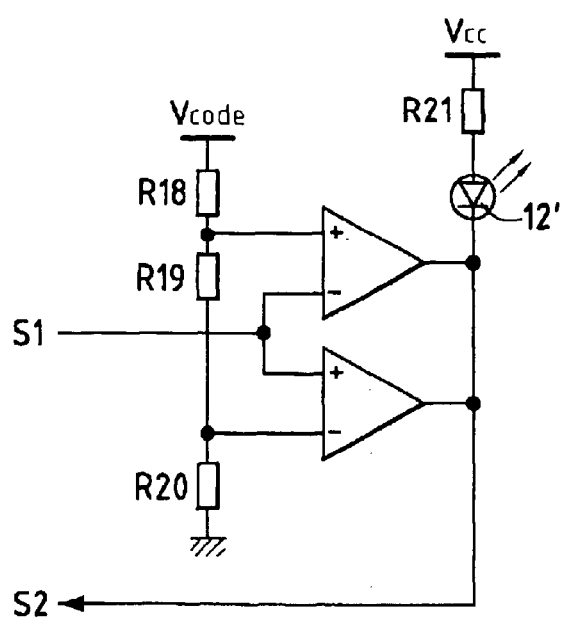
FIG. 9: An example of analogue electronics managing a fault and alert mode.

FIG. 9 shows the fault handling system represented by Unit A in FIG. 8. S1 represents the sensor signal and S2 the fault signal. The diode 12' may be located on the actuator and/or on the dashboard.

Figure 10A:
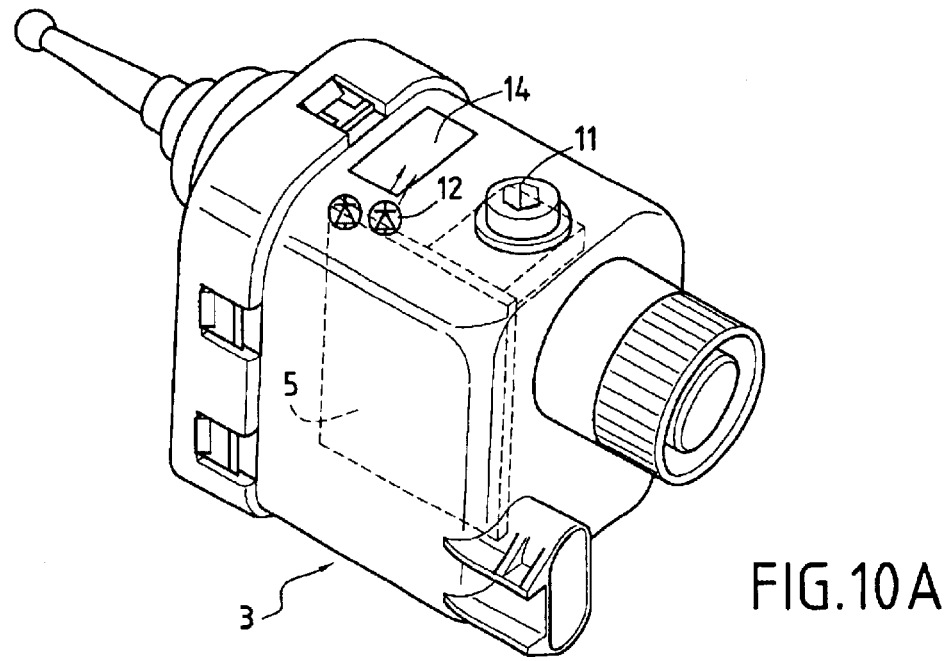
FIGS. 10a & 10b: An example of implanting the electronics in an actuator according to the invention.
Figure 10B:
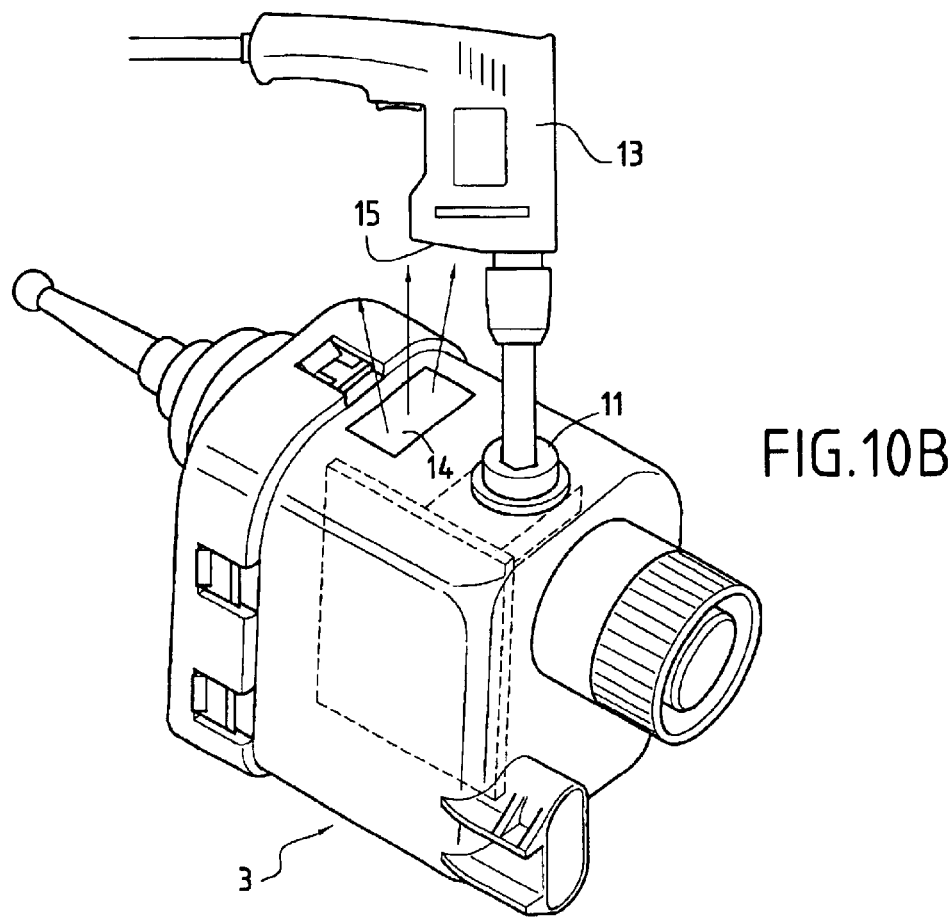

FIG. 10a shows an actuator 3 which has a box that contains the essential part of the control electronics 5, in the form of an electronic card (inside the box, shown by a dotted line in the figure). A transparent window 14, made of polycarbonate for example, is moulded into the box and protects a light-emitting diode 12. There is also a button 11, to adjust the electrical zero of the sensors, and a manual adjustment button located on the side of the actuator box, which is used to adjust the horizontal position of the headlight. Clearly, the said two adjustment buttons may each be adjusted manually or automatically. FIG. 10b thus shows automatic adjustment of the adjustment button 11, which operates as follows: on the production line, during initialisation, adjustment may be rendered automatic by using an electric screwdriver, the head of which is fitted with an optical sensor 15. During the adjustment operation, the automatic screwdriver 13 stops as soon as the signal from the comparator device is detected. This signal may be optical if it comes from a light-emitting diode 12 implanted in actuator 3, or electrical if it is generated on one of the actuator inputs.

The invention also covers these different analogue electronic control systems when they are implanted, at least partially, outside the actuator.

In conclusion, whether it adopts analogue or digital control electronics, the invention offers compact and reliable implantation of the electronics. Moreover, the variant in which the control electronics are of the analogue type is particularly advantageous, whether they are implanted in the actuator or not, for the following reasons. Trim angle correction is achieved in an analogue manner, independently, simply and without using a micro-controller. The electronic correction device can be integrated into one or both actuators. (It can therefore be installed in a completely different place on the vehicle such as on the dashboard). The correction law may be obtained simply with the aid of two resistors by judiciously reversing the power to both sensors, which reduces the number of electronic components. Furthermore, this type of assembly may be used in the head stages of a correction device using a micro-controller. This results in lower operating costs and an improvement in correction accuracy. On initialisation, the device for adjusting the demands of motors in their nominal range may comprise a comparator which triggers off a light-emitting diode or delivers an electrical signal. The device may comprise a sampling of the reference value, which enables voltage fluctuations to be avoided. The device is designed so as to be easily adjusted on the production line with the aid of an automatic tool which detects the level of adjustment. The device is capable of tilting the headlights and emitting a fault-mode signal.

What is claimed is:

1. A device for the automatic adjustment of a position of at least one headlight of a motor vehicle in relation to a bodywork by pivoting around at least one axis which is essentially parallel to a road surface, said device comprising
    at least one actuator having a motor capable of pivoting said headlight;
    initialization means for adjusting the motor back to a nominal position;
    adjustment means for monitoring progress of said initialization means, said adjustment means being accessible from outside the actuator and connected to a warning device;
    at least one sensor integral with said motor vehicle; and
    at least one electronic control system adapted to control the actuator with aid of information provided by the sensor, the electronic control system-being fixed to or implanted in the actuator.

2. A device according to claim 1, which comprises at least two sensors, one at the front and one at the rear of the vehicle.

3. A device according to claim 1, which comprises one electronic control system to adjust both headlights of the vehicle, with on actuator per headlight, the electronic control system being connected to one of the two actuators.

4. A device according to claim 3, which comprises the master electronic system fixed to or implanted in an actuator and a slave simplified electronic system in the other actuator.

5. A device according to claim 1, wherein the electronic control system is connected to one actuator per headlight.

6. A device according to claim 1, wherein the electronic control system is removable from the actuator to which the system is fixed or in which the system is implanted.

7. A device according to claim 1, wherein the electronic control system is in the form of an electronic card.

8. A device according to claim 1, wherein the electronic control system(s) is (are) digital.

9. A device according to claim 8, wherein the electronic control system(s) comprises (comprise) a computer.

10. A device according to claim 1, wherein the warning device is a light source such as a light-emitting diode.

11. A device according to claim 10, wherein the light source is integrated into a box of the actuator and protected by a transparent screen, more particularly in the form of a transparent moulding on the box.

12. A device according to claim 1, wherein the adjustment device may be adjusted automatically by a screwdriver, the screwdriver being controlled by a stop/start control system using a sensor, more particularly an optical sensor located on the screwdriver, capable of detecting the end-of-adjustment warning signal from the warning device.

13. A device according to claim 1, which has a sequential mode of operation.

14. A device according to claim 1, which comprises a fault management mode by instructing the actuator to tilt the light(s) downwards.

15. A device according to claim 14, which provides a visual warning device, such as a light-emitting diode, or an audible one, on the actuator and/or headlight and/or vehicle dashboard when the fault management system is activated.

16. A motor vehicle which has an adjustment device according to claim 1.

17. A device according to claim 1, wherein the electronic control system comprises:
    a unit to handle faults,
    a unit to calculate the weighted average of the sensors,
    an adder,
    an overvoltage protection system,
    a window comparator,
    a filter system,
    a pulse generator system, and
    an assembly with at least two resistors.

18. A device for the automatic adjustment of a position of at least one headlight of a motor vehicle in relation to a bodywork by pivoting around at least one axis which is essentially parallel to a road surface, said device comprising
    at least one actuator capable of pivoting said headlight;
    at least one sensor integral with said motor vehicle; and
    at least one electronic control system adapted to control the actuator with aid of information provided by the sensor, the electronic control system-being fixed to or implanted in the actuator, wherein said device is configured to provide a fault management mode which instructs the actuator to tilt said headlight downwards.

19. A device according claim 18, wherein the electronic control system comprises:
   a unit to handle faults,
   a unit to calculate the weighted average of the sensors,
   an adder,
   an overvoltage protection system,
   a window comparator,
   a filter system,
   a pulse generator system, and
   an assembly with at least two resistors.

20. A device according claim 18, which provides a visual warning device, such as a light-emitting diode, or an audible one, on the actuator and/or headlight and/or vehicle dashboard when the fault management system is activated.

21. A device for the automatic adjustment of a position of at least one headlight of a motor vehicle in relation to a bodywork by pivoting around at least one axis which is essentially parallel to a road surface, said device comprising
   at least one actuator capable of pivoting said headlight;
   at least one sensor integral with said motor vehicle; and
   at least one electronic control system adapted to control the actuator with aid of information provided by the sensor, the electronic control system-being analog and being fixed to or implanted in the actuator.

22. A device according to claim 21, wherein the electronic control system(s) comprises (comprise) at least one integrator, at least one subtractor and at least one follower.

23. A device according to claim 21, wherein the electronic control system(s) comprises (comprise) a unit to handle faults, a unit to calculate the weighted average of the sensors, a unit which is an adder, a unit which is an overvoltage protection system, a unit which is a window comparator, a unit which is filter system, a unit which is a pulse generator system, and a unit which is an assembly with at least two resistors.

24. A device according to claim 21, wherein the electronic control system(s) comprises (comprise) at least one potentiometer.

25. A device according to claim 21, wherein the electronic control system(s) comprises (comprise) resistors, more particularly two, which are located outside the actuators, on the electrical wiring of the vehicle or near the sensors.

* * * * *

UNITED STATES PATENT AND TRADEMARK OFFICE
CERTIFICATE OF CORRECTION

PATENT NO. : 6,942,369 B2
DATED : September 13, 2005
INVENTOR(S) : Jean François Le Bars et al.

It is certified that error appears in the above-identified patent and that said Letters Patent is hereby corrected as shown below:

Column 8,
Line 8, delete "with on actuator" and insert -- with one actuator --.

Column 9,
Lines 4 and 16, delete "according claim" and insert -- according to claim --.

Column 10,
Line 14, delete "a unit which is filter system" and insert -- a unit which is a filter system --.

Signed and Sealed this

Twenty-second Day of November, 2005

JON W. DUDAS
*Director of the United States Patent and Trademark Office*